(12) United States Patent
Umehara et al.

(10) Patent No.: US 9,197,966 B2
(45) Date of Patent: Nov. 24, 2015

(54) ELECTRONIC DEVICE

(71) Applicant: KYOCERA CORPORATION, Kyoto (JP)

(72) Inventors: Masanori Umehara, Yokohama (JP); Motonori Imamura, Yokohama (JP)

(73) Assignee: KYOCERA Corporation, Kyoto (JP)

(*) Notice: Subject to any disclaimer, the term of this patent is extended or adjusted under 35 U.S.C. 154(b) by 0 days.

(21) Appl. No.: 14/361,823

(22) PCT Filed: May 14, 2013

(86) PCT No.: PCT/JP2013/003070
§ 371 (c)(1),
(2) Date: May 30, 2014

(87) PCT Pub. No.: WO2013/172018
PCT Pub. Date: Nov. 21, 2013

(65) Prior Publication Data
US 2015/0078588 A1 Mar. 19, 2015

(30) Foreign Application Priority Data
May 14, 2012 (JP) ................. 2012-110951

(51) Int. Cl.
*H04R 17/00* (2006.01)
*H04M 1/03* (2006.01)
*H04R 7/04* (2006.01)

(52) U.S. Cl.
CPC ............ *H04R 17/00* (2013.01); *H04M 1/035* (2013.01); *H04R 7/045* (2013.01); *H04R 2460/13* (2013.01); *H04R 2499/11* (2013.01); *H04R 2499/15* (2013.01)

(58) Field of Classification Search
CPC .... H04R 2499/11; H04R 1/025; H04R 17/00; H04R 7/045; H04R 2499/15; H04M 1/0266
See application file for complete search history.

(56) References Cited

U.S. PATENT DOCUMENTS

| | | | |
|---|---|---|---|
| 7,616,771 B2* | 11/2009 | Lenhardt et al. | 381/326 |
| 2002/0192463 A1* | 12/2002 | Kiuchi et al. | 428/343 |
| 2004/0202338 A1 | 10/2004 | Longbotttom et al. | |
| 2006/0227981 A1* | 10/2006 | Miyata | 381/124 |

(Continued)

FOREIGN PATENT DOCUMENTS

| | | | |
|---|---|---|---|
| JP | 2004-336403 A | 11/2004 | |
| JP | 2005-209868 A | 8/2005 | |

(Continued)

OTHER PUBLICATIONS

International Search Report; PCT/JP2013/003070; Jun. 11, 2013.

(Continued)

*Primary Examiner* — Fan Tsang
*Assistant Examiner* — Angelica McKinney
(74) *Attorney, Agent, or Firm* — Studebaker & Brackett PC

(57) ABSTRACT

The electronic device can effectively suppress a reduction in sound pressure and an increase in the distortion factor. The electronic device (1) includes a piezoelectric element (30), a panel (10) supporting the piezoelectric element (30), and a housing (60) holding the panel (10). The electronic device (1) causes the panel (10) to generate air-conducted sound and vibration sound that is transmitted by vibrating a part of a human body. A buffer material (90) is disposed between the panel (10) and the housing (60).

21 Claims, 8 Drawing Sheets

(56) References Cited

U.S. PATENT DOCUMENTS

| | | | |
|---|---|---|---|
| 2009/0247236 A1 | 10/2009 | Kajiwara et al. | |
| 2010/0201908 A1 | 8/2010 | Ishida | |
| 2010/0225600 A1 | 9/2010 | Dai et al. | |
| 2010/0278362 A1* | 11/2010 | Kim | 381/151 |
| 2011/0205722 A1* | 8/2011 | Chen et al. | 361/807 |
| 2012/0063113 A1* | 3/2012 | Hisakawa et al. | 361/807 |
| 2013/0135242 A1 | 5/2013 | Tsurusaki | |
| 2013/0328820 A1* | 12/2013 | Kondoh et al. | 345/173 |

FOREIGN PATENT DOCUMENTS

| | | | |
|---|---|---|---|
| JP | 2005-348193 A | 12/2005 | |
| JP | 2006-333021 A | 12/2006 | |
| JP | 2007-300426 A | 11/2007 | |
| JP | 2009-246819 A | 10/2009 | |
| JP | 2010-211185 A | 9/2010 | |
| JP | 2013-239857 A | 11/2013 | |
| WO | 20121057214 A1 | 5/2012 | |
| WO | 2013/172018 A1 | 11/2013 | |
| WO | 2014/003148 A1 | 1/2014 | |

OTHER PUBLICATIONS

An Office Action; "Notice of Reasons for Rejection," issued by the Japanese Patent Office on Sep. 30, 2014, which corresponds to Japanese Patent Application No. 2014-022637 and is related to U.S. Appl. No. 14/361,823; with English language concise explanation.

An Office Action; "Notice of Reasons for Rejection," issued by the Japanese Patent Office on Mar. 17, 2015, which corresponds to Japanese Patent Application No. 2014-022637 and is related to U.S. Appl. No. 14/361,823; with English language concise explanation.

The extended European search report issued by the European Patent Office on Sep. 2, 2015, which corresponds to European Patent Application No. 13791560.9-1910 and is related to U.S. Appl. No. 14/361,823.

* cited by examiner

ELECTRONIC DEVICE

CROSS-REFERENCE TO RELATED APPLICATION

This application claims priority to and the benefit of Japanese Patent Application No. 2012-110951 filed May 14, 2012, the entire contents of which are incorporated herein by reference.

TECHNICAL FIELD

The present invention relates to an electronic device that vibrates a panel by applying a predetermined electric signal (audio signal) to a piezoelectric element and that transmits air-conducted sound and bone-conducted sound to a user by transmitting the vibration of the panel to the user's body.

BACKGROUND

Patent Literature 1 recites an electronic device, such as a mobile phone terminal or the like, that transmits air-conducted sound and bone-conducted sound to a user. As the air-conducted sound, Patent Literature 1 recites a sound that is transmitted to the user's auditory nerve by air vibrations, caused by a vibrating object, that are transmitted through the external ear canal to the eardrum and cause the eardrum to vibrate. As the bone-conducted sound, Patent Literature 1 recites a sound that is transmitted to the user's auditory nerve through a portion of the user's body (such as the cartilage of the outer ear) that is contacting a vibrating object.

Patent Literature 1 recites a telephone in which a rectangular vibrating body, formed from a piezoelectric bimorph and a flexible substance, is attached to an outer surface of a housing via an elastic member. Patent Literature 1 also discloses that when voltage is applied to the piezoelectric bimorph in the vibrating body, the piezoelectric material expands and contracts in the longitudinal direction, causing the vibrating body to undergo flexure vibration. Air-conducted sound and bone-conducted sound are transmitted to the user when the user contacts the vibrating body to the auricle.

CITATION LIST

Patent Literature 1: JP 2005-348193 A

SUMMARY

In the electronic device disclosed in Patent Literature 1, the vibrating body is attached to the outer surface of the housing of the mobile phone terminal or the like. Therefore, the small vibrating body protruding from the outer surface of the housing needs to be held to the ear, which may be inconvenient. Accordingly, it has been proposed to provide the vibrating body on the back face (inner surface) of the panel in a mobile phone terminal or the like and cause the panel to deform due to deformation of the vibrating body so as to transmit air-conducted sound and bone-conducted sound to an object (ear) in contact with the panel.

In the above-described Patent Literature 1, however, no consideration is made of the various problems that occur when the panel deforms.

The present invention addresses problems in an electronic device that vibrates a panel, so as to provide an excellent electronic device.

An electronic device according to the present invention includes: a piezoelectric element; a panel supporting the piezoelectric element; a housing holding the panel, such that the electronic device causes the panel to generate air-conducted sound and vibration sound that is transmitted by vibrating a part of a human body; and a buffer material between the panel and the housing.

Both the piezoelectric element and the buffer material may be disposed at one end of the panel in one direction in plan view.

The buffer material may become thinner with increasing distance from the piezoelectric element towards the other end of the panel.

The buffer material may be adhered to only one of the panel and the housing.

The housing may include sheet metal as an insert member.

The piezoelectric element may be rectangular in plan view, and the buffer material may be disposed further outwards than an edge of the piezoelectric element in a longitudinal direction of the piezoelectric element.

The housing may include a first housing portion and a second housing portion that is located inward from the first housing portion and includes the sheet metal.

The buffer material may be disposed further towards the other end of the panel in the one direction than the piezoelectric element.

The display unit may be held by the panel, and the buffer material may be in contact with the display unit.

The buffer material may be in a pressed state before vibration of the piezoelectric element.

The housing may be rectangular in plan view, and a length of two opposing sides of the housing may be equal to or greater than a length from an antitragus to an inferior antihelix crus.

A length of the other two opposing sides of the housing may be equal to or greater than a length from a tragus to an antihelix.

The piezoelectric element may be fixedly joined to the housing by a joining member.

The joining member may be a non-heat hardening adhesive.

The joining member may be double-sided tape.

The panel may be joined to the housing by a joining member.

The joining member joining the panel to the housing may be a non-heat hardening adhesive.

The joining member joining the panel to the housing may be double-sided tape.

The panel may constitute a portion or an entirety of any one of a display unit, an input unit, and a cover for the display unit.

A fixed portion of the piezoelectric element in the panel may be positioned outside of a region of the panel overlapping the display unit in plan view.

The display unit may be fixed to the panel from inside the housing.

The present invention solves problems in an electronic device that vibrates a panel, thereby providing an excellent electronic device.

BRIEF DESCRIPTION OF DRAWINGS

The present invention will be further described below with reference to the accompanying drawings, wherein.

DESCRIPTION OF EMBODIMENTS

Figure 1:
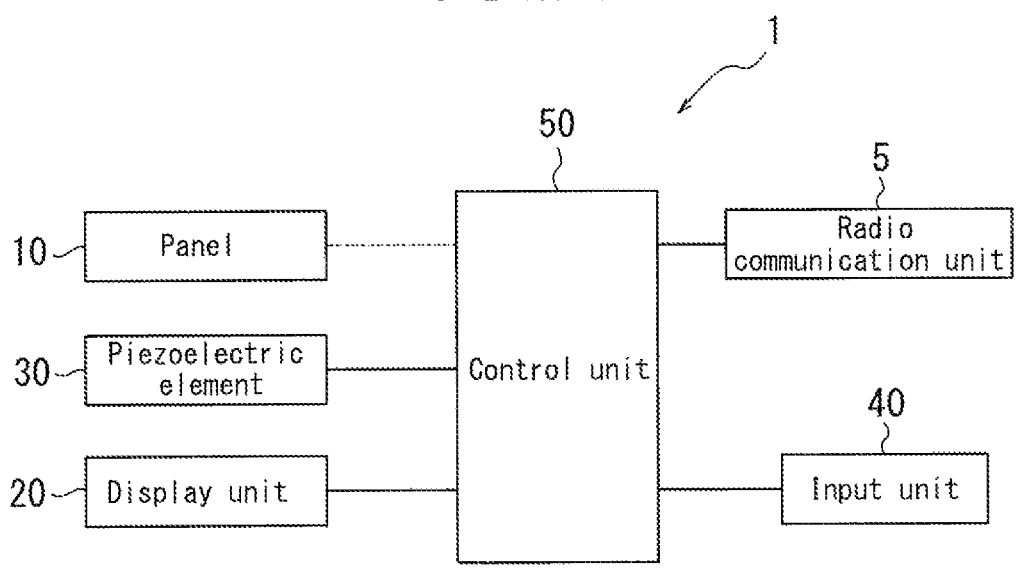
FIG. 1 is a functional block diagram of the main parts of an electronic device according to an embodiment of the present invention.

Embodiments of the present invention will be described in detail with reference to the accompanying drawings. FIG. 1 is a functional block diagram of the main parts of an electronic device 1 according to an embodiment of the present invention. The electronic device 1 is, for example, a mobile phone terminal and is provided with a radio communication unit 5, a panel 10, a display unit 20, a piezoelectric element 30, an input unit 40, and a control unit 50. The radio communication unit 5 is a well-known configuration and is connected by radio to a base station or the like over a communication network.

The panel 10 is a touch panel that detects contact or is a cover panel or the like that protects the display unit 20. The panel 10 is, for example, made from glass or a synthetic resin such as acrylic or the like. The panel 10 is preferably plate-like in shape. The panel 10 may be a flat plate or may be a curved panel, the surface of which is smoothly inclined. When the panel 10 is a touch panel, the panel 10 detects contact by the user's finger, a pen, a stylus pen or the like. Any detection system may be used in the touch panel, such as a capacitive system, a resistive film system, a surface acoustic wave system (or an ultrasonic wave system), an infrared system, an electromagnetic induction system, a load detection system, or the like.

The display unit 20 is a display device such as a liquid crystal display, an organic EL display, an inorganic EL display, or the like. The display unit 20 is provided at the back side of the panel 10. For example, the display unit 20 may be disposed on the back face of the panel 10 by a joining member (for example, adhesive). Alternatively, the display unit 20 may be adhered to the panel 10 by a joining member (for example, adhesive) or supported by the housing of the electronic device 1 at a distance from the panel 10.

The piezoelectric element 30 is formed by elements that, upon application of an electric signal (voltage), either expand and contract or flex (bend) in accordance with the electromechanical coupling coefficient of their constituent material. Ceramic or crystal elements, for example, are used. The piezoelectric element 30 may be a unimorph, bimorph, or laminated piezoelectric element. Examples of a laminated piezoelectric element include a laminated unimorph element with layers of unimorph (for example, 16 or 24 layers) and a laminated bimorph element with layers of bimorph (for example, 16 or 24 layers). Such a laminated piezoelectric element may be configured with a laminated structure formed by a plurality of dielectric layers composed of, for example, lead zirconate titanate (PZT) and electrode layers disposed between the dielectric layers. Unimorph expands and contracts upon the application of an electric signal (voltage), and bimorph flexes upon the application of an electric signal (voltage).

The piezoelectric element 30 is disposed on the back face of the panel 10 (the face on the inner side of the electronic device 1). The piezoelectric element 30 is attached to the panel 10 by a joining member (for example, double-sided tape). The piezoelectric element 30 may be attached to the panel 10 with an intermediate member (for example, sheet metal) therebetween. Once disposed on the back face of the panel 10, the piezoelectric element 30 is separated from the inner surface of the housing by a predetermined distance. The piezoelectric element 30 is preferably separated from the inner surface of the housing by the predetermined distance even when expanding and contracting or flexing. In other words, the distance between the piezoelectric element 30 and the inner surface of the housing is preferably larger than the maximum amount of deformation of the piezoelectric element 30.

The input unit 40 accepts operation input from the user and may be configured, for example, using operation buttons (operation keys). Note that when the panel 10 is a touch panel, the panel 10 can also accept operation input from the user by detecting contact by the user.

The control unit 50 is a processor that controls the electronic device 1. The control unit 50 applies a predetermined electric signal (a voltage corresponding to an audio signal, such as the other party's voice, music including ringtones or songs, or the like) to the piezoelectric element 30. Note that the audio signal may be based on music data stored in internal memory, or may be music data stored on an external server or the like and played back over the network.

Upon application of the electric signal to the piezoelectric element 30, the piezoelectric element 30 expands and contracts or flexes in the longitudinal direction. At this point, the panel 10 to which the piezoelectric element 30 is attached deforms in conjunction with the expansion and contraction or flexing of the piezoelectric element 30. The panel 10 thus undergoes flexure vibration. Here, the maximum voltage of the electric signal that the control unit 50 applies to the piezoelectric element 30 may, for example, be ±15 V. This is higher than ±5 V, i.e. the applied voltage of a so-called panel speaker for conduction of sound by air-conducted sound rather than vibration sound. In this way, even if the user presses the panel 10 against the user's body with, for example, a force of 3 N or greater (a force of 5 N to 10 N), sufficient flexure vibration is generated in the panel 10, so that a vibration sound can be generated via a part of the user's body (such as the cartilage of the outer ear). Note that the magnitude of the applied voltage used may be appropriately adjusted in accordance with the fixation strength of the panel 10 with respect to the housing or a support member, or in accordance with the performance of the piezoelectric element 30. The panel 10 flexes due to expansion and contraction or to flexing of the piezoelectric element 30. The panel 10 is bent directly by the piezoelectric element 30. Stating that "the panel 10 is bent directly by the piezoelectric element" differs from the phenomenon utilized in known panel speakers, whereby the panel deforms upon vibration of a particular region of the panel due to the inertial force of a piezoelectric actuator constituted by a piezoelectric element disposed in the casing. Stating that "the panel 10 is bent directly by the piezoelectric element" refers instead to how expansion and contraction or flexure (bending) of the piezoelectric element directly bends the panel via the joining member or via the joining member and the below-described reinforcing member 100.

The panel 10 undergoes flexure vibration not only in the region in which the piezoelectric element 30 is attached, but also in a region separate from the attachment region. In the region of vibration, the panel 10 includes a plurality of locations at which the panel 10 vibrates in a direction intersecting the main surface of the panel. At each of these locations, the value of the vibration amplitude changes over time from positive to negative or vice-versa. At a given instant during vibration of the panel 10, portions with a relatively large vibration amplitude and portions with a relatively small vibration amplitude appear to be distributed cyclically over nearly the entire panel 10. In other words, a plurality of vibration waves are detected across the entire panel 10. The maximum voltage that the control unit 50 applies to the piezoelectric element 30 may be ±15 V to prevent dampening of the above-described vibration of the panel 10 even if the user presses the panel 10 against the user's body with a force of, for example, 5 N to 10 N. Therefore, the user can hear sound by contacting a region distant from the above-described attachment region of the piezoelectric element 30, such as the central part of the panel 10, to the ear.

Figure 2:
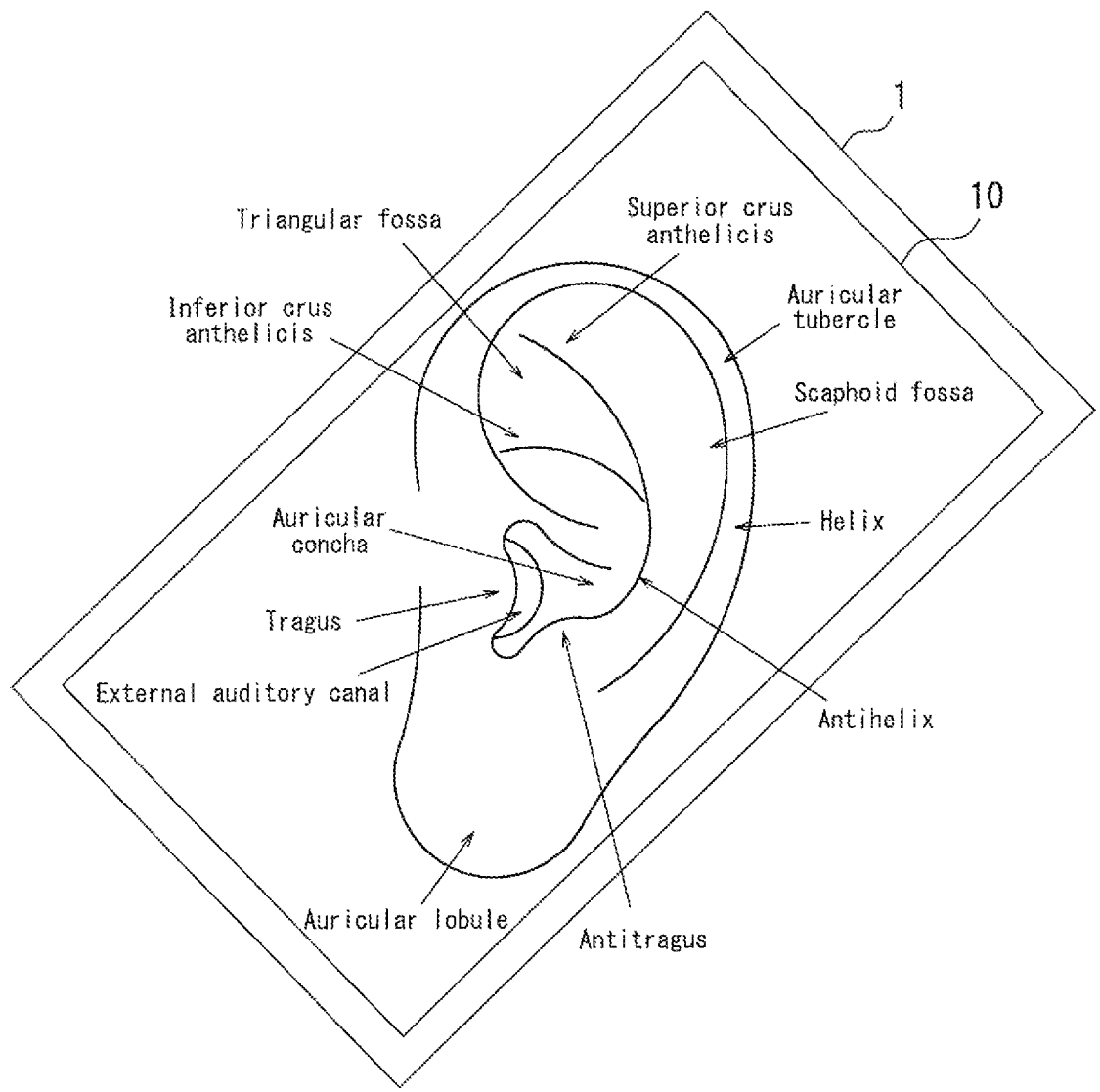
FIG. 2 illustrates a suitable configuration of a panel.

The panel 10 may be nearly the same size as the user's ear. As illustrated in FIG. 2, the panel 10 may also be larger than the user's ear. Adopting such a size makes it easier for the panel 10 of the electronic device 1 to cover the entire ear when the user listens to sound, thus making it difficult for surrounding sounds (noise) to enter the external ear canal. The region of the panel 10 (or the below-described housing 60, 60a) that vibrates should be larger than a region having a length corresponding to the distance from the inferior antihelix crus to the antitragus and a width corresponding to the distance from the tragus to the antihelix. The region of the panel 10 that vibrates preferably has a length corresponding to the distance from a position in the helix near the superior antihelix crus to the earlobe and a width corresponding to the distance from the tragus to a position in the helix near the antihelix. The region with the above length and width may be a rectangular region or may be an elliptical region with the above length as the major axis and the above width as the minor axis. The average size of a Japanese person's ear can be looked up in sources such as the Japanese Body Dimension Data (1992-1994) gathered by the Research Institute of Human Engineering for Quality Life (HQL). Note that if the panel 10 is at least as large as the average size of a Japanese person's ear, it is thought that the panel 10 will be a size capable of covering the entire ear of most non-Japanese people. With the above-described dimensions and shape, the panel 10 can cover the user's ear and has tolerance for misalignment when placed against the ear.

By vibration of the panel 10, the electronic device 1 can transmit vibration sound through a part of the user's body (such as the cartilage of the outer ear) and air-conducted sound to the user. Therefore, when sound is output at a volume equivalent to a known dynamic receiver, the sound that is transmitted to the periphery of the electronic device 1 by air vibrations due to vibration of the panel 10 is smaller than with a dynamic receiver. Accordingly, the electronic device 1 is appropriate for listening to recorded messages, for example, on the train or the like.

Furthermore, the electronic device 1 transmits vibration sound by vibration of the panel 10, and therefore even if the user is wearing earphones or headphones, the user can hear sound through the earphones or headphones and through a part of the body by contacting the electronic device 1 against the earphones or headphones.

The above electronic device 1 transmits sound to a user by vibration of the panel 10. Therefore, if the electronic device 1 is not provided with a separate dynamic receiver, it is unnecessary to form an opening (sound discharge port) for sound transmission in the housing, thereby simplifying waterproof construction of the electronic device 1. On the other hand, if the electronic device 1 is provided with a dynamic receiver, the sound discharge port should be blocked by a member permeable by air but not liquid. Gore-Tex (registered trademark) is an example of a member permeable by air but not liquid.

Embodiment 1

Figure 3A:
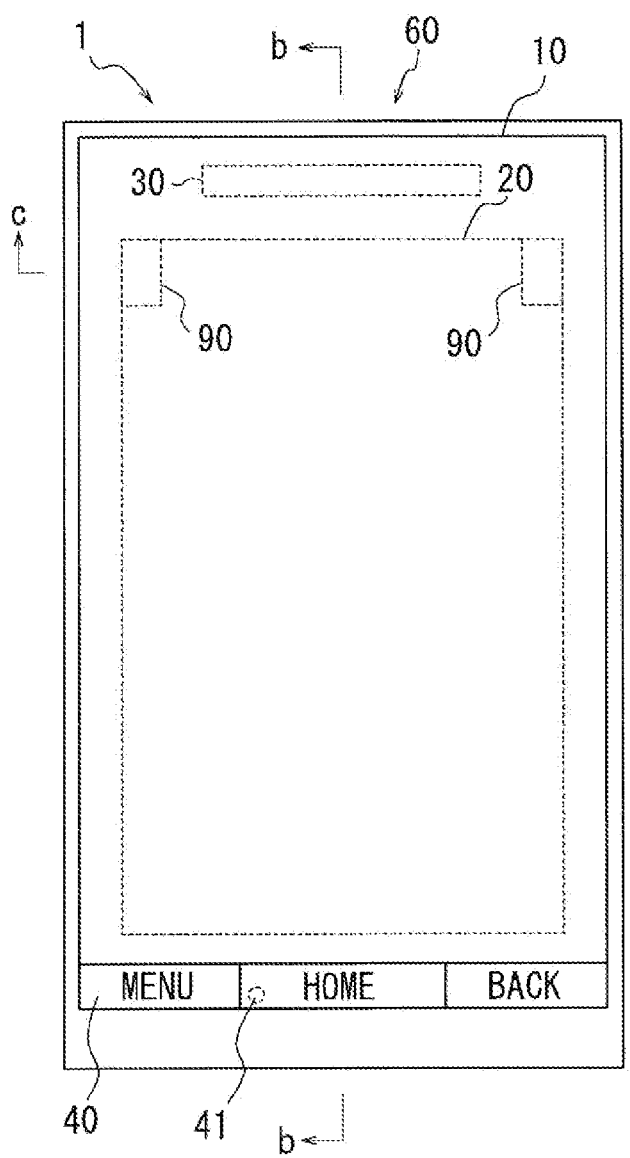
FIGS. 3(a) to 3(c) schematically illustrate the main parts of a housing structure of an electronic device according to Embodiment 1.
Figure 3B:
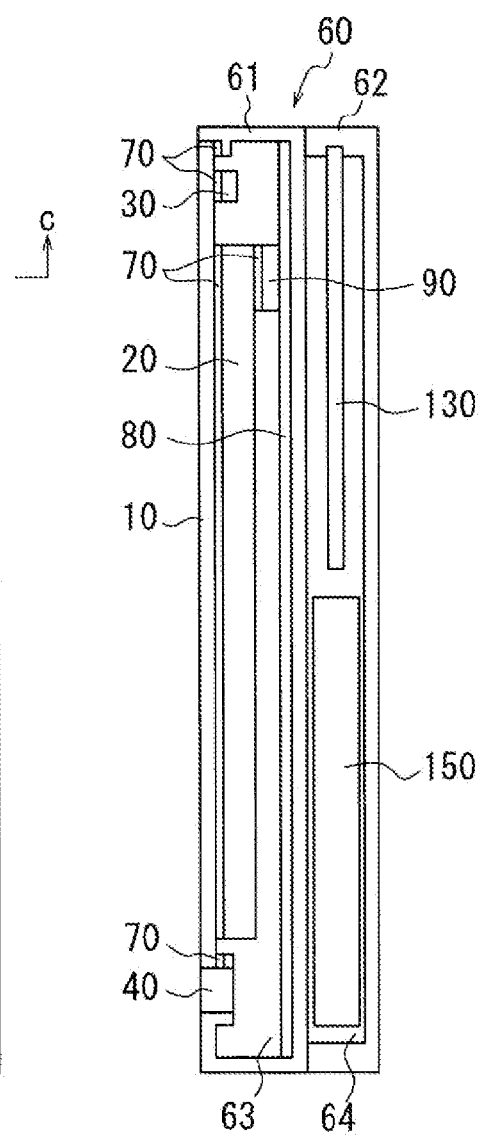
Figure 3C:
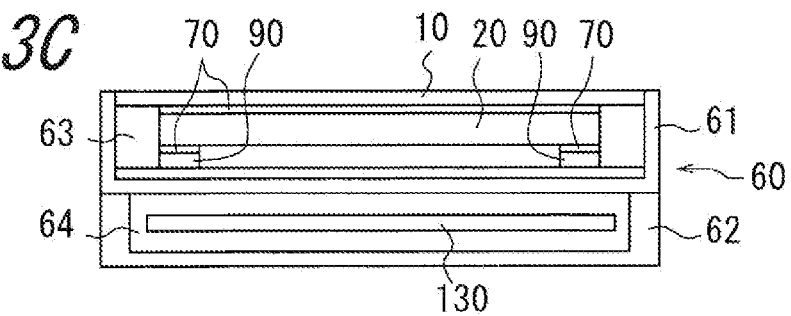

FIGS. 3(a) to 3(c) schematically illustrate the main parts of a housing structure of the electronic device 1 according to Embodiment 1. FIG. 3(a) is a front view, and FIG. 3(b) is a cross-sectional view along the b-b line of FIG. 3(a). FIG. 3(c) is a cross-sectional view along the c-c line of FIG. 3(a). The electronic device 1 illustrated in FIGS. 3(a) to 3(c) is a smartphone in which a glass plate that is generally oblong (generally rectangular) in plan view is disposed on the front face of a housing 60 (e.g. a metal or resin case) as the panel 10.

The panel 10 constitutes a capacitive-type touch panel, for example, and is supported (held) by the housing 60 with a joining member 70 therebetween. The display unit 20 is joined to the panel 10 by the joining member 70 along the back face thereof, except at the upper part of one end in one direction in plan view, i.e. the longitudinal direction. In other words, the display unit 20 is fixed to the panel 10 by the joining member 70. The piezoelectric element 30 is joined to the panel 10, with the joining member 70 therebetween, at the upper part of the back face at one end of the panel 10 in the longitudinal direction and is supported by the panel 10. In other words, as illustrated in FIG. 3(a), the fixed portion of the piezoelectric element 30 is positioned outside of a region where the panel 10 and the display unit 20 overlap in plan view. The piezoelectric element 30 is also fixed to the housing 60 by the joining member 70 with the panel 10 therebetween. The piezoelectric element 30 is generally rectangular in plan view and is joined with a long side thereof along a short side of the panel 10. Note that the joining member 70 is thermosetting or ultraviolet curable adhesive, double-sided tape, or the like. The joining member 70 may, for example, be optical elasticity resin, which is clear and colorless acrylic ultraviolet curing adhesive.

Figure 4:
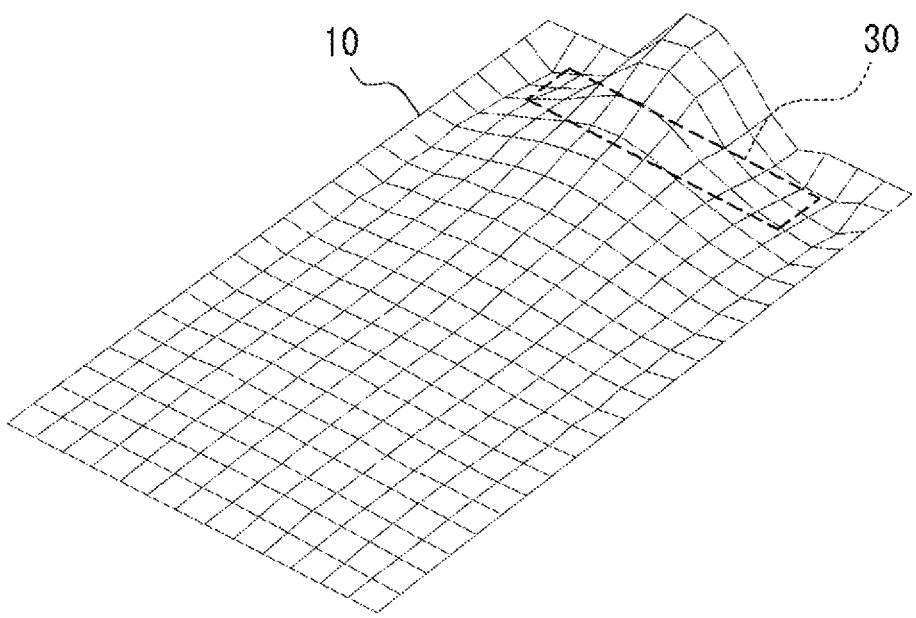
FIG. 4 illustrates an example of vibration of a panel in the electronic device according to Embodiment 1.

FIG. 4 illustrates an example of vibration of the panel 10 in the electronic device 1 according to Embodiment 1. In the electronic device 1 according to Embodiment 1, the display unit 20 is attached to the panel 10. Therefore, the other end of the panel 10 vibrates less easily than the end of the panel 10 at which the piezoelectric element 30 is attached (also referred to below as the main vibrating part). As a result, at the other end of the panel 10, sound leakage due to vibration of the other end of the panel 10 is reduced. One end of the panel 10 is bent directly by the piezoelectric element 30, and hence compared to this end, vibration dampens at the other end. The panel 10 is bent by the piezoelectric element 30 in the direction of the long sides of the piezoelectric element 30 such that the portion of the panel 10 immediately above the piezoelectric element 30 rises the highest as compared to adjacent portions.

In FIGS. 3(a) to 3(c), the input unit 40 is supported by the housing 60 at the other end of the panel 10 in the longitudinal direction. A mouthpiece 41 of a microphone is formed in the input unit 40, as indicated by the dashed line. In other words, the piezoelectric element 30 is disposed at the upper part of one end of the generally rectangular housing 60, and the mouthpiece 41 is formed at the lower part of the other end.

The housing 60 is provided with a rear case (first housing portion) 62 and a front case (second housing portion) 61 located inward from the rear case 62. The rear case 62 is detachable from the front case 61. The front case 61 includes a concavity 63. Similarly, the rear case 62 includes a concavity 64. The front case 61 and the rear case 62 are not limited to a concave shape and may be configured with any suitable shape.

The front case 61 is configured to include sheet metal 80, which is an insert member. The panel 10, display unit 20, piezoelectric element 30, and input unit 40 are disposed in the concavity 63 of the front case 61.

Between the display unit 20 and the sheet metal 80, a buffer material 90 is disposed. The buffer material 90 reduces interference with the sheet metal 80 (contact with the sheet metal 80) by the display unit 20, which undergoes flexure vibration as a result of vibration by the piezoelectric element 30. In other words, the buffer material 90 is disposed between the panel 10 and the front case 61, which is a portion of the housing, and reduces interference between the panel 10 and the front case 61. The buffer material may be a Super Critical Fluid (SCF) substance, a foam material, or the like, such as sponge or expanded polystyrene.

The buffer material 90 is joined to the display unit 20 with the joining member 70 therebetween. The buffer material 90 is also in contact with the sheet metal 80 without a joining member therebetween. Note that a gap may also exist between the buffer material 90 and the sheet metal 80, so that the buffer material 90 and the sheet metal 80 are not in contact. The buffer material 90 is not limited to being joined to the display unit 20 rather than the sheet metal 80, and the buffer material 90 may alternatively be adhered to only one of the display unit 20 and the sheet metal 80.

The buffer material 90 can be set to become thinner with increasing distance from the piezoelectric element 30 towards the other end, i.e. with distance from the main vibrating part. The vibration in a region becomes smaller as the region is an increasing distance from the main vibrating part, making it more difficult for the display unit 20 to contact the sheet metal 80. Therefore, the buffer material 90 can be made thinner. Note that instead of the display unit 20 and the sheet metal 80 being disposed in parallel as illustrated in FIG. 3(b), the electronic device 1 may be configured in accordance with the shape of this buffer material 90 so that the gap between the display unit 20 and the sheet metal 80 grows smaller with increasing distance from the piezoelectric element 30 towards the other end.

When the thickness of the buffer material 90 is greater than the gap between the display unit 20 and the sheet metal 80, then the buffer material 90 is disposed between the display unit 20 and the sheet metal 80 in a pressed state from before vibration of the piezoelectric element 30. This pressed state refers to a state in which the buffer material 90 is deformed by being compressed. Note that when the thickness of the buffer material 90 is equal to the gap between the display unit 20 and the sheet metal 80, the buffer material 90 may be disposed between the display unit 20 and the sheet metal 80 without being compressed.

In the present embodiment, like the piezoelectric element 30 disposed at one end of the panel 10 in the longitudinal direction, the buffer material 90 is disposed at one end. In other words, as illustrated in FIG. 3(a), the buffer material 90 is disposed near the piezoelectric element 30.

In the present embodiment, the buffer material 90 is disposed further outwards than the edges, in the longitudinal direction, of the piezoelectric element 30. In other words, as illustrated in FIG. 3(a), in the longitudinal direction of the piezoelectric element 30, the buffer material 90 is disposed further towards the outer periphery of the panel 10 than the piezoelectric element 30.

Furthermore, in the present embodiment, the buffer material 90 is disposed further towards the other end of the panel 10 in one direction (the longitudinal direction) than the piezoelectric element 30. In other words, as illustrated in FIG. 3(a), the buffer material 90 is disposed on the side of the piezoelectric element 30 facing the input unit 40 disposed at the other end.

A variety of electronic components are disposed between the bottom of the concavity 63 in the front case 61 and the bottom of the concavity 64 in the rear case 62. In FIG. 3(b), a circuit board 130 having embedded therein electronic components necessary for implementing the functions of the control unit 50 (processor, memory, and the like) and a battery 150 for driving the electronic device 1 are disposed in the concavity 64.

Figure 5:
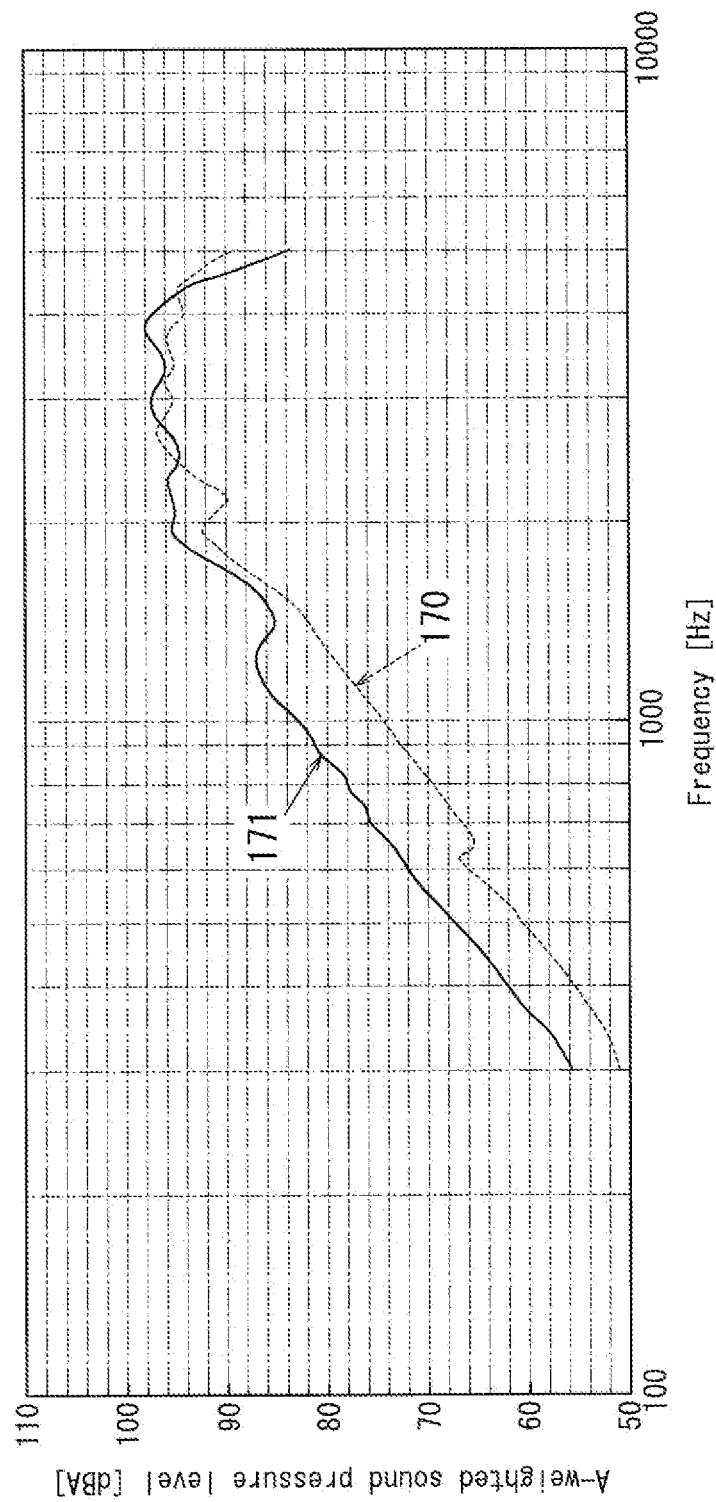
FIG. 5 illustrates frequency characteristics related to the sound pressure of the electronic device according to Embodiment 1.

FIG. 5 illustrates frequency characteristics related to the sound pressure of the electronic device 1 according to Embodiment 1. FIG. 5 shows frequency characteristics 170 for when no buffer material 90 is disposed between the display unit 20 and the sheet metal 80 and frequency characteristics 171 for when the buffer material 90 is disposed between the display unit 20 and the sheet metal 80. The horizontal axis represents frequency in Hz, and the vertical axis represents the A-weighted sound pressure level in dBA. As illustrated in FIG. 5, in the 300 Hz to 1000 Hz frequency band, for example, the sound pressure level increases by approximately 5 dBA to 10 dBA by providing the buffer material 90.

Figure 6:
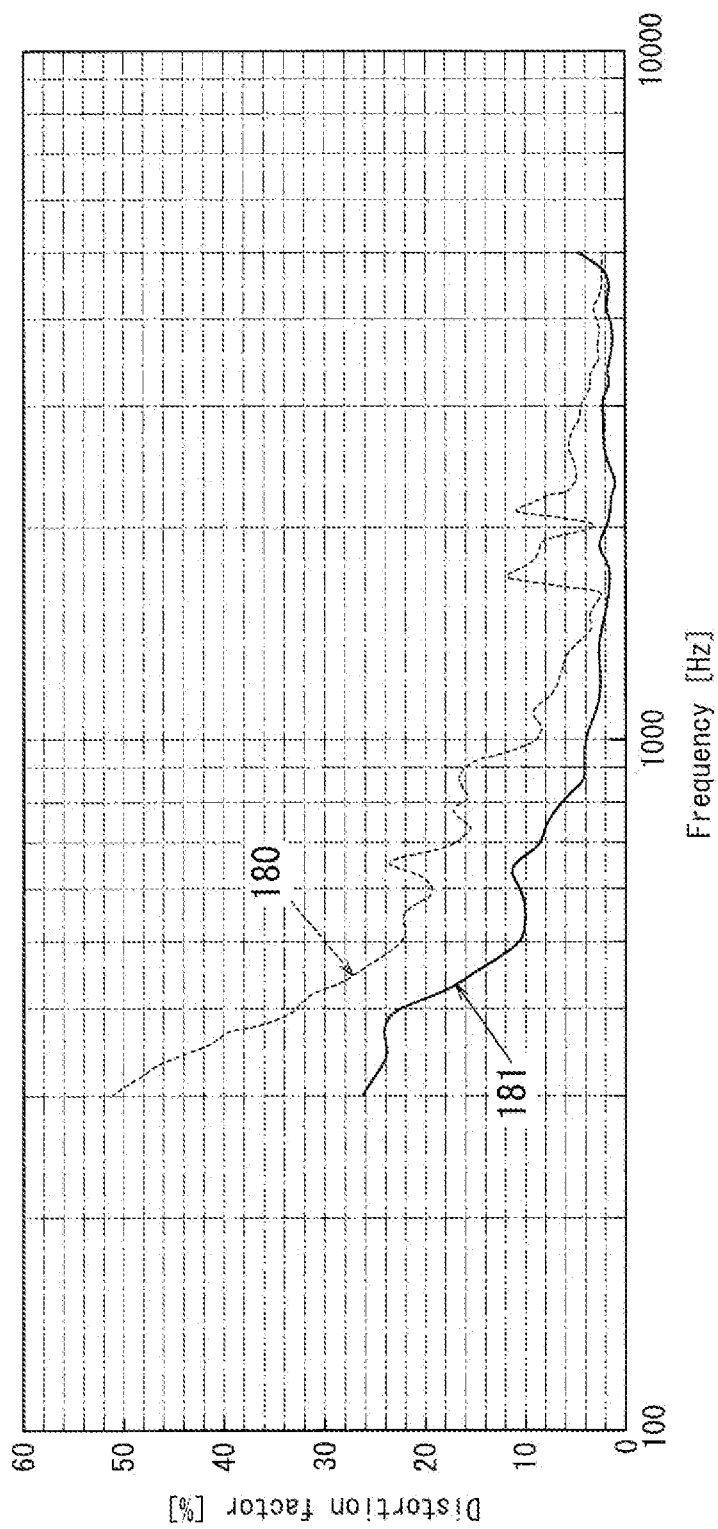
FIG. 6 illustrates frequency characteristics related to the distortion factor of the electronic device according to Embodiment 1.

FIG. 6 illustrates frequency characteristics related to the distortion factor of the electronic device 1 according to Embodiment 1. The distortion factor represents the degree of distortion in the vibration waveform and is defined as the ratio of the harmonics to the fundamental frequency. As the distortion factor is smaller, the proportion of the harmonics with respect to the fundamental frequency is smaller. The distortion factor thus represents sound quality. FIG. 6 shows frequency characteristics 180 for when no buffer material 90 is disposed between the display unit 20 and the sheet metal 80 and frequency characteristics 181 for when the buffer material 90 is disposed between the display unit 20 and the sheet metal 80. The horizontal axis represents frequency in Hz, and the vertical axis represents the distortion factor as a percentage. As illustrated in FIG. 6, in the 300 Hz to 1000 Hz frequency band, for example, the distortion factor is reduced by approximately 4% to 24% by providing the buffer material 90.

According to the electronic device 1 of the present embodiment, the panel 10 thus deforms in conjunction with deformation of the piezoelectric element 30 attached to the back face of the panel 10, thereby vibrating sufficiently in a region from the end in the longitudinal direction, at which the piezoelectric element 30 is adhered, to near the central part of the panel 10. Accordingly, by contacting a part of the body (such as the cartilage of the outer ear) to at least a portion of the region from the central part to the upper part of the panel 10, the user can hear air-conducted sound and vibration sound caused by vibration of the panel 10. As a result, air-conducted sound and vibration sound can be transmitted to the user without projecting the vibrating body from the outer surface of the housing 60, thereby improving usability over the electronic device disclosed in Patent Literature 1, in which a vibrating body extremely small as compared to the housing is pressed against the user's body. The piezoelectric element 30 also does not damage easily, since the user's ear need not be pressed against the piezoelectric element itself. Moreover, causing the housing 60 rather than the panel 10 to deform makes it easier for the user to drop the terminal when vibration is generated. By contrast, vibrating the panel 10 prevents this problem.

In the present embodiment, the display unit 20 and the piezoelectric element 30 are joined to the panel 10 by the joining member 70. The piezoelectric element 30 can thus be attached to the panel 10 in a way that avoids restricting the degree of freedom for deformation of the piezoelectric element 30. The joining member 70 may be a non-heat hardening adhesive. Such adhesive has the advantage that, during hardening, thermal stress contraction does not easily occur between the panel 10 and the display unit 20 or piezoelectric element 30. The joining member 70 may also be double-sided tape. Such tape has the advantage that the contraction stress when using adhesive or the like is not easily produced between the panel 10 and the display unit 20 or piezoelectric element 30. Furthermore, since the panel 10 is also joined to the housing 60 by the joining member 70, similar effects are obtained.

In the present embodiment, the buffer material 90 is disposed between the display unit 20 and the sheet metal 80. Hence, it is possible to reduce interference with the sheet metal 80 when the display unit 20 undergoes flexure vibration as a result of vibration by the piezoelectric element 30. Accordingly, it is possible to reduce a drop in sound pressure and an increase in the distortion factor produced by vibration of the panel 10. By suppressing or reducing interference between the display unit 20 and the sheet metal 80, the gap between the display unit 20 and the sheet metal 80 can correspondingly be made smaller, thus promoting a reduction in size of the electronic device 1.

In the present embodiment, both the piezoelectric element 30 and the buffer material 90 are disposed at one end of the panel 10 in one direction in plan view. Since the region of the panel 10 where the piezoelectric element 30 is attached (main vibrating part) vibrates the most, the interference between the display unit 20 and the sheet metal 80 can be suppressed or reduced effectively by providing the buffer material 90 at the same side as the piezoelectric element 30.

In the present embodiment, the buffer material 90 is adhered to only the display unit 20 and only contacts the sheet metal 80. By not adhering the buffer material 90 to both the display unit 20 and the sheet metal 80, tension can be prevented from occurring between the display unit 20 and the sheet metal 80 via the buffer material 90, and the likelihood of the flexure vibration of the panel 10 being restricted more than necessary can be reduced.

In the present embodiment, the front case 61 includes the sheet metal 80 as an insert member. While maintaining the strength of the electronic device 1, the sheet metal 80 allows for a reduction in thickness.

In the present embodiment, the buffer material 90 is disposed further outwards than the edges, in the longitudinal direction, of the piezoelectric element 30. Since the main vibration, i.e. a large vibration, occurs inwards from the edges of the piezoelectric element 30, disposing the buffer material 90 further outwards reduces the likelihood of the desired vibration being restricted more than necessary.

Embodiment 2

Figure 7A:
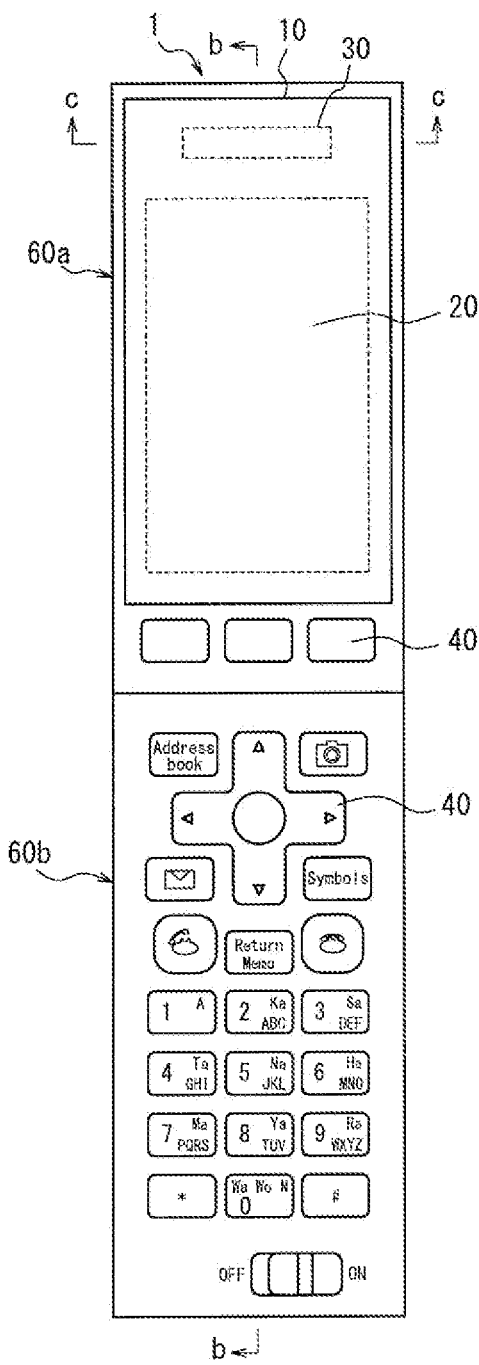
FIGS. 7(a) to 7(c) schematically illustrate the main parts of a housing structure of an electronic device according to Embodiment 2.
Figure 7B:
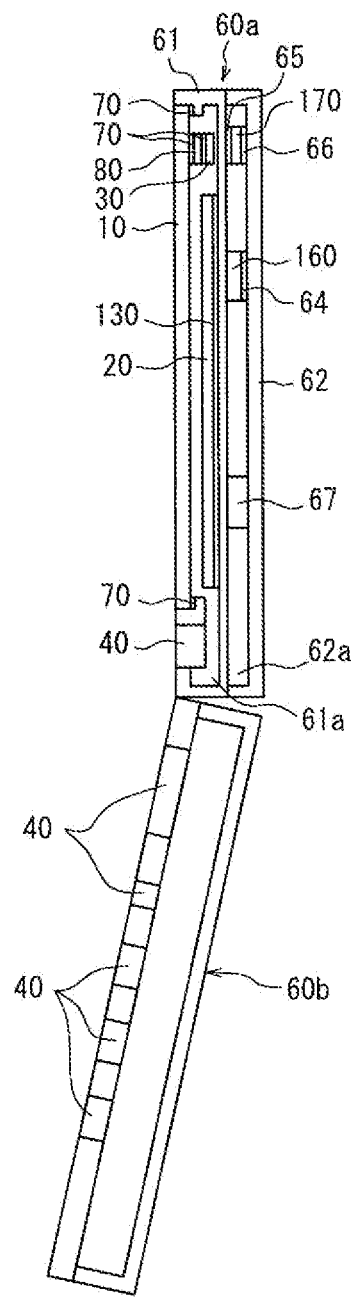
Figure 7C:
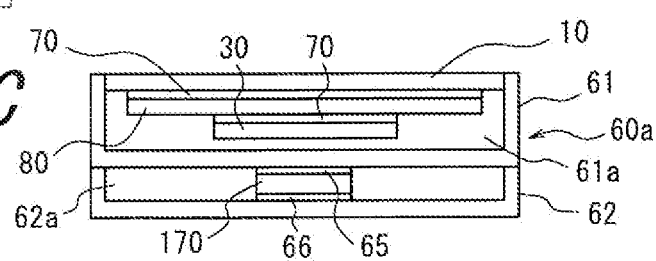

FIGS. 7(a) to 7(c) illustrate a housing structure of the electronic device 1 according to Embodiment 2. FIG. 7(a) is a front view, FIG. 7(b) is a cross-sectional view along the b-b line of FIG. 7(a), and FIG. 7(c) is a cross-sectional view along the c-c line of FIG. 7(a). The electronic device 1 illustrated in FIGS. 7(a) to 7(c) is a clamshell mobile phone terminal in which a cover panel (an acrylic plate) protecting the display unit 20 is disposed on the front face of an upper housing 60a as the panel 10, with the input unit 40 disposed on a lower housing 60b. The display unit 20, piezoelectric element 30, and circuit board 130 are disposed in a concavity 65 of the housing 60a. Note that to clarify the illustration, FIG. 7(c) omits the piezoelectric element 30 and reinforcing member 100 that are visible between the two pieces of buffer materials 90.

In Embodiment 2, the reinforcing member 100 is disposed between the panel 10 and the piezoelectric element 30. The reinforcing member 100 is, for example, a resin plate, sheet metal, or a resin plate including glass fiber. In other words, in the electronic device 1 according to Embodiment 2, the piezoelectric element 30 and the reinforcing member 100 are adhered by the joining member 70, and furthermore the reinforcing member 100 and the panel 10 are adhered by the joining member 70.

Furthermore, in Embodiment 2, the display unit 20 is not adhered to the panel 10, but rather is supported by the housing 60a. Specifically, in the electronic device 1 according to Embodiment 2, the display unit 20 is separated from the panel 10 and is joined to the housing 60a with the circuit board 130 therebetween. Note that like the front case 61 in Embodiment 1, the housing 60a can be structured to include sheet metal.

The buffer material 90 is disposed between the panel 10 and the display unit 20 (housing 60a), as in Embodiment 1. The panel 10 and the buffer material 90 are joined with the joining member 70 therebetween, whereas the display unit 20 and the buffer material 90 are in contact without a joining member therebetween. As in Embodiment 1, the panel 10 and the buffer material 90 may be in contact without a joining member therebetween, and the display unit 20 and the buffer material 90 may be joined with a joining member therebetween.

Figure 8:
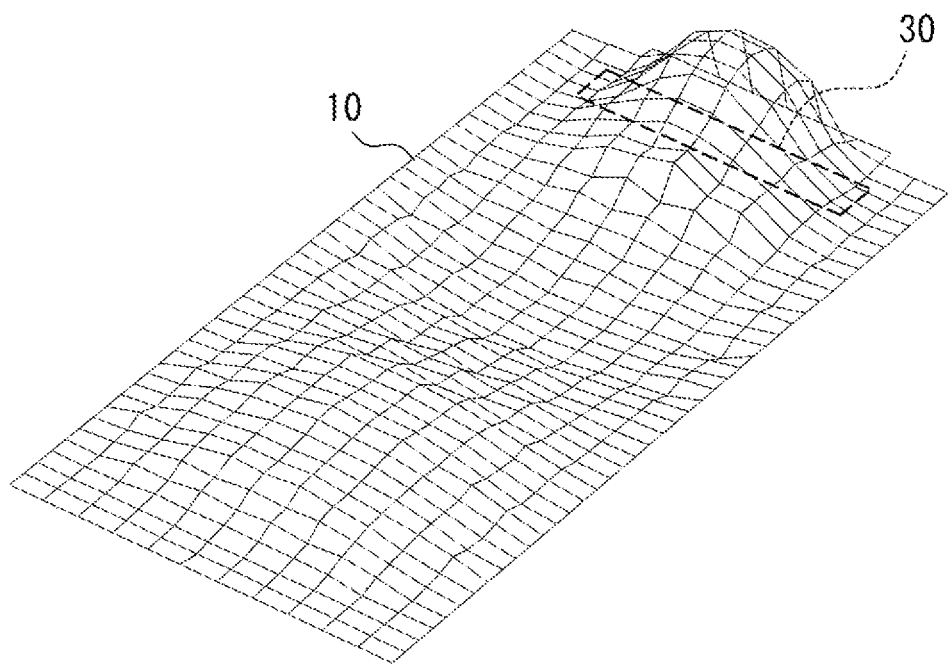
FIG. 8 illustrates an example of vibration of a panel in the electronic device according to Embodiment 2.

FIG. 8 illustrates an example of vibration of the panel 10 in the electronic device 1 according to Embodiment 2. In the electronic device 1 according to Embodiment 2, the panel 10 is an acrylic plate with lower stiffness than a glass plate, and the display unit 20 is not adhered to the back face of the panel 10. Therefore, as compared to the electronic device 1 according to Embodiment 1 illustrated in FIG. 4, the amplitude produced by the piezoelectric element 30 is greater. Moreover, the panel 10 vibrates not only in the region in which the piezoelectric element 30 is attached, but also in a region separate from the attachment region. Therefore, in addition to air-conducted sound, the user can hear vibration sound by contacting the ear to any position on the panel 10.

In the electronic device 1 according to the present embodiment, the reinforcing member 100 and the panel 10 deform in conjunction with deformation of the piezoelectric element 30 attached to the panel 10 via the reinforcing member 100, so that air-conducted sound and vibration sound are transmitted to an object that contacts the deforming panel 10. As a result, air-conducted sound and vibration sound can be transmitted to the user without the user's ear being pressed against the vibrating body itself. Furthermore, the piezoelectric element 30 is attached to the surface of the panel 10 facing the inside of the housing 60a. Air-conducted sound and vibration sound can thus be transmitted to the user without projecting the vibrating body from the outer surface of the housing 60a. Moreover, the panel 10 deforms not only in the region in which the piezoelectric element 30 is attached, but rather throughout the panel 10 in order to transmit air-conducted sound and vibration sound. Therefore, in addition to air-conducted sound, the user can hear vibration sound by contacting the ear to any position on the panel 10.

In the present embodiment, disposing the reinforcing member 100 between the piezoelectric element 30 and the panel 10 can reduce the probability of an external force being transmitted to and damaging the piezoelectric element 30 if, for example, such a force is applied to the panel 10. Moreover, even if the panel 10 is pressed firmly against the user's body, vibrations of the panel 10 do not dampen easily. By disposing the reinforcing member 100 between the piezoelectric element 30 and the panel 10, the resonance frequency of the panel 10 also decreases, thereby improving the acoustic characteristics in the low frequency band. Note that instead of the reinforcing member 100, a plate-shaped anchor may be attached to the piezoelectric element 30 by the joining member 70.

In the present embodiment, the buffer material 90 is disposed between the panel 10 and the display unit 20. Hence, it is possible to reduce interference with the display unit 20 when the panel 10 undergoes flexure vibration as a result of vibration by the piezoelectric element 30.

In the present embodiment, the buffer material 90 is adhered to only the panel 10 and only contacts the display unit 20. By not adhering the buffer material 90 to both the panel 10 and the display unit 20, tension can be prevented from occurring between the panel 10 and the display unit 20 via the buffer material 90, and the likelihood of the flexure vibration of the panel 10 being restricted more than necessary can be reduced.

Although the present invention has been described by way of embodiments with reference to the accompanying drawings, it is to be noted that various changes and modifications will be apparent to those skilled in the art. Therefore, such changes and modifications are to be understood as included within the scope of the present invention. For example, the functions and the like included in the various members and steps may be reordered in any logically consistent way. Furthermore, components or steps may be combined into one or divided.

For example, when the panel 10 and the display unit 20 do not overlap, the piezoelectric element 30 may be disposed at the center of the panel 10. When the piezoelectric element 30 is disposed at the center of the panel 10, vibration of the piezoelectric element 30 is transmitted uniformly across the entire panel 10, thereby improving quality of air-conducted sound and permitting recognition of vibration sound when the user's ear contacts any of various positions on the panel 10. A plurality of piezoelectric elements 30 may also be provided.

The piezoelectric element 30 is attached to the panel 10 in the above electronic device 1 but instead may be attached to a location other than the panel 10. For example, in Embodiment 1, the piezoelectric element 30 may be attached to the rear case 62 that is attached to the housing 60 and covers the battery 150. Since the rear case 62 is often attached to a different face than the panel 10 in the electronic device 1 of a mobile phone terminal or the like, according to this structure the user can hear sound by contacting a part of the body (such as the ear) to a different face than the panel 10. In this case, the buffer material 90 is disposed between the rear case 62, which undergoes flexure vibration due to the piezoelectric element 30, and a part that can come into contact with the rear case 62 (for example, the battery 150).

Furthermore, the panel 10 may constitute a portion or the entirety of any of a display panel, an operation panel, a cover panel, or a lid panel that allows for removal of a rechargeable battery. In particular, when the panel 10 is a display panel, the piezoelectric element 30 is disposed on the outside of a display region fulfilling a display function. This offers the advantage of not blocking the display. The operation panel includes the touch panel of Embodiment 1. The operation panel also includes a sheet key, in which the tops of operation keys are integrally formed in, for example, a clamshell mobile phone terminal so as to constitute one face of the housing alongside an operation unit.

Note that in Embodiments 1 and 2, the joining member that adheres the panel 10 and the piezoelectric element 30, the joining member that adheres the panel 10 and the housing 60 (60a), and the like have been described as the joining member 70, using the same reference numeral. The joining members used in Embodiments 1 and 2, however, may differ as needed in accordance with the components being joined.

REFERENCE SIGNS LIST

1: Electronic device
5: Radio communication unit
10: Panel
20: Display unit
30: Piezoelectric element
40: Input unit
41: Mouthpiece
50: Control unit
60, 60a, 60b: Housing
61: Front case (second housing portion)
62: Rear case (first housing portion)
63, 64, 65: Concavity
70: Joining member
80: Sheet metal
90: Buffer material
100: Reinforcing member
130: Circuit board
150: Battery

The invention claimed is:

1. An electronic device comprising:
   a piezoelectric element;
   a panel supporting the piezoelectric element;
   a display unit attached by the panel;
   a housing holding the panel, wherein the electronic device generates vibration sound that is transmitted by vibrating a part of a human body in contact with the panel and air-conducted sound by bending the panel directly by the piezoelectric element; and
   a buffer material between an inner surface of the display unit that is opposite to a surface of the display unit that the panel is attached and an inner surface of the housing that is opposite to a side of the panel facing the display unit,
   wherein the piezoelectric element is elongated in shape and has a length longer than a width thereof, and the buffer material is disposed outwards of outermost edges of the piezoelectric element in a longitudinal direction along a length direction of the piezoelectric element.

2. The electronic device according to claim 1, wherein both the piezoelectric element and the buffer material are disposed at one end of the panel in one direction in plan view.

3. The electronic device according to claim 2, wherein the buffer material becomes thinner with increasing distance from the piezoelectric element towards the other end of the panel.

4. The electronic device according to claim 3, wherein the piezoelectric element is rectangular in plan view.

5. The electronic device according to claim 4, wherein the buffer material is disposed further towards the other end of the panel in the one direction than the piezoelectric element.

6. The electronic device according to claim 1, wherein the buffer material is adhered to only one of the panel and the housing.

7. The electronic device according to claim 1, wherein the housing includes sheet metal as an insert member.

8. The electronic device according to claim 7, wherein the housing comprises a first housing portion and a second housing portion that is located inward from the first housing portion and includes the sheet metal.

9. The electronic device according to claim 1, wherein a display unit is held by the panel, and the buffer material is in contact with the display unit.

10. The electronic device according to claim 1, wherein the buffer material is in a pressed state before vibration of the piezoelectric element.

11. The electronic device according to claim 1, wherein the housing is rectangular in plan view, and a length of two opposing sides of the housing is equal to or greater than a length from an antitragus to an inferior antihelix crus.

12. The electronic device according to claim 11, wherein a length of the other two opposing sides of the housing is equal to or greater than a length from a tragus to an antihelix.

13. The electronic device according to claim 1, wherein the piezoelectric element is fixedly joined to the housing by a joining member.

14. The electronic device according to claim 13, wherein the joining member is a non-heat hardening adhesive.

15. The electronic device according to claim 13, wherein the joining member is double-sided tape.

16. The electronic device according to claim 1, wherein the panel is joined to the housing by a joining member.

17. The electronic device according to claim 16, wherein the joining member is a non-heat hardening adhesive.

18. The electronic device according to claim 16, wherein the joining member is double-sided tape.

19. The electronic device according to claim 1, wherein the panel constitutes a portion or an entirety of any one of a display unit, an input unit, and a cover for the display unit.

20. The electronic device according to claim 19, wherein a fixed portion of the piezoelectric element in the panel is positioned outside of a region of the panel overlapping the display unit in plan view.

21. The electronic device according to claim 19, wherein the display unit is fixed to the panel from inside the housing.

* * * * *